(12) United States Patent  
McCall (10) Patent No.: US 8,066,194 B2  
(45) Date of Patent: Nov. 29, 2011

(54) SYSTEM AND METHOD FOR MANAGING INFORMATION

(75) Inventor: Glenn McCall, Canberra (AU)

(73) Assignee: Teradata US, Inc., Dayton, OH (US)

( * ) Notice: Subject to any disclaimer, the term of this patent is extended or adjusted under 35 U.S.C. 154(b) by 1325 days.

(21) Appl. No.: 11/532,239

(22) Filed: Sep. 15, 2006

(65) Prior Publication Data

US 2007/0064012 A1    Mar. 22, 2007

Related U.S. Application Data

(60) Provisional application No. 60/718,837, filed on Sep. 20, 2005.

(51) Int. Cl.
*G06K 19/06* (2006.01)

(52) U.S. Cl. .............. 235/494; 345/619; 707/9; 707/10; 706/47; 705/32

(58) Field of Classification Search ................... 235/494; 345/619; 707/9, 10; 706/47; 705/35
See application file for complete search history.

(56) References Cited

U.S. PATENT DOCUMENTS

| | | | |
|---|---|---|---|
| 2001/0056351 A1* | 12/2001 | Valentine et al. | 704/270 |
| 2005/0172263 A1* | 8/2005 | Hariharan et al. | 717/109 |
| 2006/0059060 A1* | 3/2006 | Horn et al. | 705/35 |
| 2006/0179028 A1* | 8/2006 | Bram et al. | 706/47 |
| 2007/0070066 A1* | 3/2007 | Bakhash | 345/419 |
| 2007/0150562 A1* | 6/2007 | Stull et al. | 709/223 |

* cited by examiner

*Primary Examiner* — Allyson Trail
(74) *Attorney, Agent, or Firm* — John D. Cowart (57) ABSTRACT

A system and method for managing a complex information process. The system includes an interface for allowing a user to manipulate identifiers indicative of respective information processes to create a user-defined process order; and a processor responsive to the interface for compiling the information processes in accordance with the user-defined process order to define a complex information process. The method includes the steps of manipulating identifiers indicative of respective information processes to create a user-defined process order; and compiling the information processes in accordance with the user-defined process order to define a complex information process.

44 Claims, 4 Drawing Sheets

SYSTEM AND METHOD FOR MANAGING INFORMATION

CROSS REFERENCE TO OTHER APPLICATIONS

This application claims priority under 35 U.S.C. §119(e) to the following co-pending and commonly-assigned patent applications, which are incorporated herein by reference:

U.S. Provisional application Ser. No. 60/718,837, entitled "A System and Method for Managing Information," filed on Sep. 16, 2005.

U.S. application Ser. No. 11/511,824, entitled "Techniques for Processing and Reporting Information," by Glenn McCall, David Brophy, and Jim Powell, filed on Aug. 30, 2006; which claims priority to U.S. Provisional Application Ser. No. 60/712,595, filed on Aug. 30, 2005.

BACKGROUND

Information processes that manipulate information in a data source are known. Common examples are SQL processes, which are run on SQL-type databases to modify, manipulate or obtain information in the database, amongst other functions. In particular, many information processes obtain data from one location, and export that data to a further location. Useful information processes are often included as functionalities of software applications, for example applications that assist in the administration and interrogation of a database.

Often, it is valuable to use a plurality of information processes in conjunction with each other. For example, using a first information process to obtain a first table of information, a second information process to obtain a second table of information, and a third information process to compare these tables of information and perform further action based on the comparison.

For the purpose of this document, an information process defined by a plurality of information processes being performed in conjunction with each other is referred to as a "complex information process". The task of defining a complex information process becomes more complicated in scenarios where the desire is to combine information processes that are performed on different information sources. As such, the generation of complex information processes is typically not suitable for end users who often have an inaccurate or incomplete understanding of the sources.

Developing a complex information process is often relatively complicated, particularly when part of the process involves loading data into one or more software applications. That is, some information processes require information to be fed into a particular application. This often necessitates a further information process to identify the relevant information and format it in accordance with the demands of the particular application. The technical nature of such a task is typically beyond the skill of an average end user.

Any discussion of the prior art throughout the specification should in no way be considered as an admission that such prior art is widely known or forms part of common general knowledge in the field.

SUMMARY

It is an object of the present invention to overcome or ameliorate at least one of the disadvantages of the prior art, or to provide a useful alternative.

According to a first aspect of the invention, there is provided a system for managing information, the system including:

an interface for allowing a user to manipulate identifiers indicative of respective information processes to create a user-defined process order; and a processor responsive to the interface for compiling the information processes in accordance with the user-defined process order to define a complex information process.

According to a second aspect of the invention, there is provided a method for managing information including the steps of:

manipulating identifiers indicative of respective information processes to create a user-defined process order; and compiling the information processes in accordance with the user-defined process order to define a complex information process.

According to a further aspect of the invention, there is provided a system for interfacing a plurality of information sources that accept information in compliance with respective data entry protocols, the system including:

an identifier associated with each information source, each identifier being indicative of the respective data entry protocol for the associated information source;

an input for receiving a first packet of information from a first one of the information sources;

an output for providing a second packet of information to a second one of the information sources; and a processor in communication with the input and responsive to the identifier of the second one of the information sources for generating the second packet such that the second packet complies with the data entry protocol of the second one of the information sources.

In an embodiment the second packet is derived from the first packet. More preferably, the first packet and the second packet are substantially identical.

In an embodiment the processor is also responsive to the identifier of the first one of the information sources for generating the second packet.

BRIEF DESCRIPTION OF THE DRAWINGS

The benefits and advantages of the present invention will become apparent to those skilled in the art to which this invention relates from the subsequent description of exemplary embodiments and the appended claims, taken in conjunction with the accompanying drawings, in which:

DETAILED DESCRIPTION

Referring to the drawings, it will be appreciated that, in the different figures, corresponding features have been denoted by corresponding reference numerals.

Figure 1:
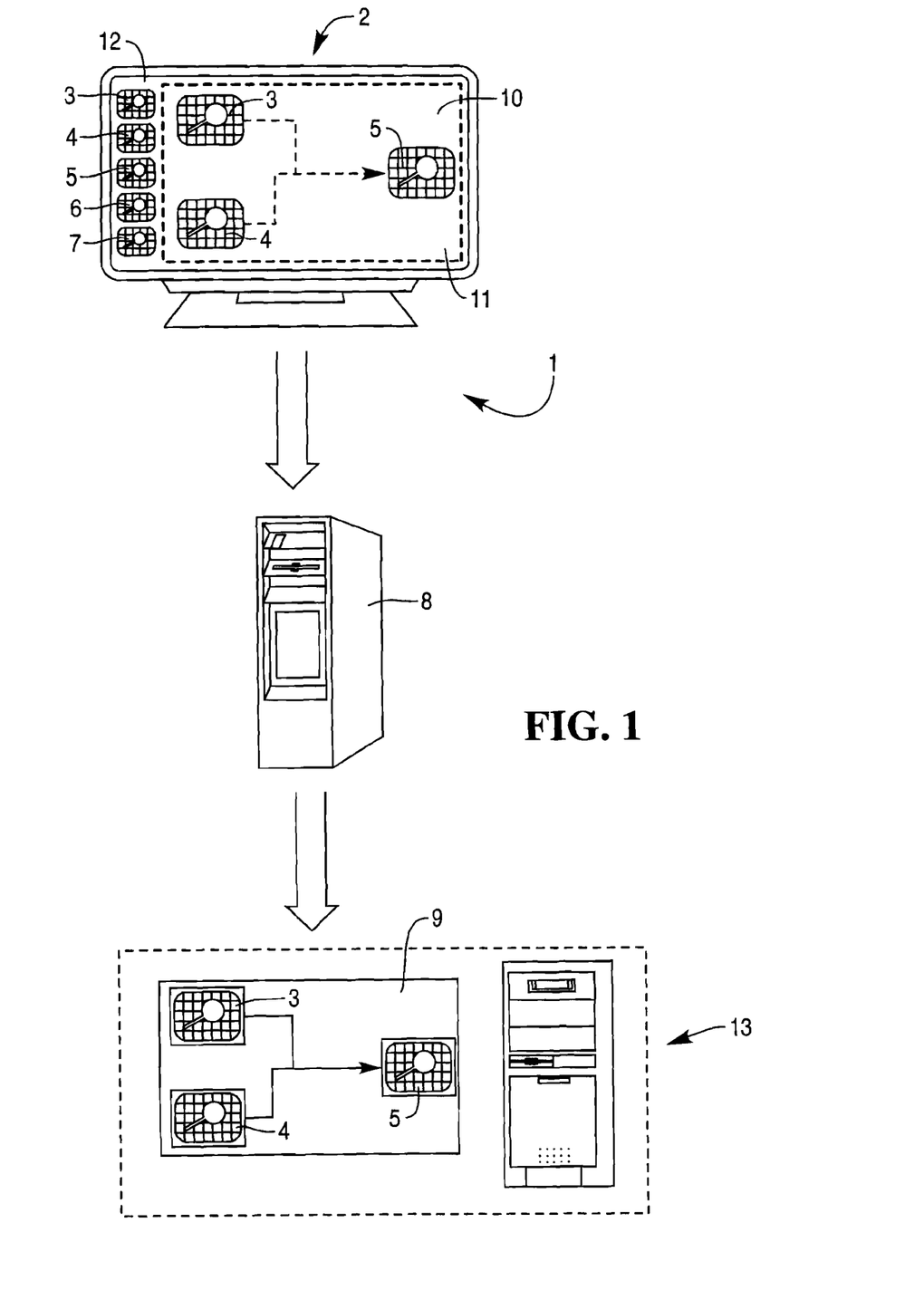
FIG. 1 is a schematic view of a system for managing information according to the invention.

Referring initially to FIG. 1, there is provided a system 1 for managing information. System 1 includes an interface 2 for manipulating identifiers, in the form of icons 3 to 7, each icon being indicative of a respective information process. Icons 3 to 7 are manipulated to create a user-defined process order. A processor 8 is responsive to interface 2 for compiling the information processes in accordance with the user-defined process order to define a complex information process 9.

It is noted that icons 3 to 7 are graphically identical in the schematic representation of FIG. 1. Despite this, it is appreciated that in practice a number of visually distinct icons are used, each icon being somehow graphically representative of an aspect of the respective information process. In some embodiments this includes trademarks or other branding.

For the purpose of this specification, the term "information process" refers generally to any method, system, command, query or script that performs a given function on information in an electronic environment. For example, the majority of information processes include any one or more of the following:

- A process for importing one or more columns of data from one or more tables into an application.
- A process for querying a data source to generate a data table;
- A process for querying a data table to generate a further data table;
- A process for manipulating data in a data source;
- A process for manipulating data in a generated data table; and
- A process for carrying out a function.

Information processes come from a variety of sources. They range from individually designed SQL statements to functionalities of third-party applications. In some cases, third party applications are shipped with icons for use with in system 1. For example, a particular application is sold with a plurality of icons indicative of information processes inherent to that application. This includes both information process indicative of functionalities of the application, and information processes indicative of a manner of importing data into the application.

The present embodiments are described with particular reference to processes used in conjunction with a data warehouse including one or more databases that make use of Java Database Connectivity (JDBC).

In the present embodiment, at least one of icons 3 to 7 is an import icon indicative of an information process for importing into an application one or more columns of data from one or more tables. The import icon provides access to a selection interface for nominating the one or more columns of data and the one or more tables. It is noted that an initial implementation of system 1 need not include an import icon. That is, system I need only possess the capability to function with an import icon that is subsequently installable. Moreover, the relevant import icon need not be developed at the time implementation of system 1. The functionality relating to import icons will be further described by way of example below.

Examples of other icons used in embodiments include a generic "process query" icon and a "create and load table with data" icon.

Interface 2 includes a graphical user interface 10 (GUI) in which icons 3 to 7 are graphically manipulatable. Although this specification predominately discloses details of a GUI, other interfaces are used in alternate embodiments. It will be appreciated that GUIs are relatively user friendly, and provide for convenient conceptualisation by the user of the processes. This is particularly contrasted with an interface that merely displays code.

GUI 10 includes a free form drawing field 11 for graphically creating the user-defined process order by graphically representing the icons in a two dimensional plane, this plane being defined by field 11. The user manipulates the icons in field 11 relative to each other. In the illustrated exemplary representation of GUI 10, icons 3 to 7 appear in a sidebar 12, and are manually dragged and dropped into field 11 by the user using an appropriate peripheral device, such as a conventional mouse. In the illustrated example, icons 3, 4 and 5 have been dropped into field 11. It will be recognised that icons 3 to 5 appear in field 11 as well as sidebar 12. Moreover, it is allowable for a unique icon to be dropped into field 11 more than once—that is, a single process is performed more than once in the user defined process order.

In some embodiments, icons 3 to 7 represent generic capabilities, such as the capabilities to create and load a table. Once placed into the drawing field 11, a user supplies specific information to complete the relevant task. For example: a "create and load table" icon is supplied with a name for the table that is to be created and an SQL query that is used to load data into that table. This is explained in more detail below.

Throughout the present specification there are references to specific methods of interacting within an interface, such as "dragging and dropping" and "clicking on an icon". These are included for exemplary purposes only, and many alternate methods of interaction will be known by those familiar with the art. Such methods include, but are not limited to:

- single clicking;
- prolonged clicking;
- double clicking,
- left/right clicking;
- pull down menus;
- check boxes;
- selectively revealable menus;
- keyboard strokes;
- mouse specific methods;
- touch screen specific methods; and
- voice actuation.

Once dropped into field 11, icons 3 to 5 are graphically interlinked to define a sequence in which the processes are performed in the user defined process order. As such, a form of flowchart graphically represents the user defined process order. In the illustrated embodiment, the processes identified by icons 3 and 4 are performed in parallel, whilst the process identified by icon 5 is performed sequentially; that is, upon the completion of both of the processes respectively identified by icons 3 and 4. It will be appreciated that performing multiple queries of a single database in parallel often mandates leveraging a suitable query management protocol. Where this is not done, queries shown as parallel in the user defined process order are actually carried out successively, albeit in quick succession, and prior to any subsequent sequential process that requires input from the parallel processes.

Those skilled in the art will appreciate the various tools that are used in various GUIs to interlink icons in a generic sense, such as arrow or line tools, connectors, and the like. Dashed lines are used in field 11 to designate the interlinking as modifiable at that stage. It will be noticed that the lines in process 9 are not dashed, indicating that the interlinking is set and finalised following the actions of processor 8. It will be appreciated that process 9 is conceptually no different at that stage to any of the processes identified by icons 3 to 7. As such, a further icon indicative of process 9 is able to be manipulated within interface 2 and comprise part of a further complex information process.

When a user has arranged and interlinked the icons to define the desired process order, a signal is sent from interface 2 to processor 8 to indicate that manipulation is complete. For the sake of the present example, this is taken to occur when icons 3 to 5 are arranged in the manner shown in field 11 of FIG. 1. In response to this signal, processor 8 is responsive to interface 2 for compiling the information processes identified by icons 3 to 5 to define complex information process 9. In particular, processor 9 is responsive to the manner in which icons 3 to 5 are interlinked to generate the necessary code to digitally join the respective processes in accordance with the selected sequence. Despite this, in other embodiments such code is generated manually.

In some embodiments, processor 8 is used to save an information processes to local storage, such as a hard disk or removable media. This is particularly relevant for processes that are "works in progress", such as processes that a user has not finalised. In some such embodiments, system 1 also provides the functionality for the user to execute a complex information process prior to it being compiled by processor 8, for example directly from interface 2. It will be appreciated that this is useful for testing and debugging of partially created processes.

In some embodiments system 1 includes functionality to load a compiled complex process 9 into interface 2 for modification or addition. Insofar as the schematic representations are concerned, this equates to making the unbroken lines dashed. As such, compiled process 9 retains some information relating to its initial construction in interface 2, and this information is used by system 1 when loading the compiled complex process.

Each information process has one or more execution requirements that, in practice, limit the manner in which processes are performed. In some embodiments, interface 2 is responsive to these execution requirements for restricting manipulation of icons 3 to 7. For example, where a first process identified by a first icon must be performed sequentially following a second process identified by a second icon, interface 2 restricts a user from manipulating the relevant icons to define a process order wherein the first process is performed before the second process. In some embodiments this restriction is achieved through graphical means, whilst in other embodiments the restriction is conveyed from error messages during the compiling process. In other embodiments there are no restrictions, and it is up to the user to ensure the process order is capable of operation in practice.

System 1 includes server 13 for executing complex information processes. As such, system 1 is adapted for both defining a complex process, and submitting this complex process for unattended execution. The benefits of this insofar as automating useful processes is concerned will be appreciated. In particular, complicated multi-step processes that formerly required much manual intervention are able to be compiled into a single complex process and submitted to a server for complete execution without a requirement of ongoing manual intervention. Server 13 executes the complex information process in response to one or more predefined events such as:
- at one or more predetermined times selected randomly, periodically, pseudo randomly, or intermittently;
- upon the completion of a predetermined process;
- following a predetermined event
- upon the receipt of new data in a predetermined information source;
- following a notification of a predetermined class.

In the present embodiment, server 13 is initialised to be responsive to notifications or notifications provided by other components within a wider information system network. For example, a database providing a notification indicating that new data has been loaded, or an application providing a notification that a transaction has been completed.

Server 13 is provided with instructions relating to the times at which process 9 is to be executed. In some embodiments, these instructions are embedded into process 9 by interface 2. This allows for beneficial automation and unattended execution of process 9. In other embodiments the instructions are directly provided to server 13, such as instructions to perform process 9 at time X or upon receipt of notification Y.

Icons 3 to 7 and any imported icons are templates of specific capabilities. When placed into field 11, these icons are manually supplied with parameters necessary for them to execute completely. For example, consider where one of the icons 3 to 7 is used to create and load a database table with data. Once placed into field 11, the icon is manually supplied with the specific details needed to complete this function. These details typically include, among other things, a name for the table to be created and rules—such as SQL—used to obtain the data to be loaded into the table.

Interface 2 includes a process editor (not shown) that is used to configure the information processes identified by icons 3 to 7. For example, where the processes are SQL based, the process editor provides access to the SQL code, and allows for modification of this code. Suitable software based editors will be known to those skilled in the art. In the present embodiment, a user actuates the process editor by double-clicking on an icon or alternate clicking on an icon and choosing "properties" from a menu selection. This opens a process editor window containing the code and/or parameters associated with the process identified by that icon. If desired, a user modifies the code and/or parameters, and the modified process is saved. Modifying a process results in the creation of a further icon indicative of the modified process. It will be appreciated that some process modification will often be necessary to facilitate seamless interlinking of icons and their respective processes. In other cases, modification is used to obtain information in a different form. Consider a process X that obtains A and B to calculate C, and from this derive D. In some cases, this process is used in the context of a complex information process where D is of no use, and it is more desirable to load C into a distinct application E for further derivation using a process F. In this case, process X is modified using the process editor to remove or modify the SQL language that deals with the derivation of D from C. Instead, process X finishes by putting C into a table. An import icon indicative of application E is interlinked in succession to the icon indicative of process X, and the selection interface for that icon is used to nominate the relevant columns in the table containing C. Process F is then interlinked successively to the import icons indicative of application E. In some embodiments, this icon is integrated with the icon indicatives of process F, that is, process F includes the code necessary for functionality as an import icon for application E. Those skilled in the art will recognise the technical difficulty of such modification to be relatively low, particularly when compared with the technical nature of the bulk of the process code.

Figure 3:
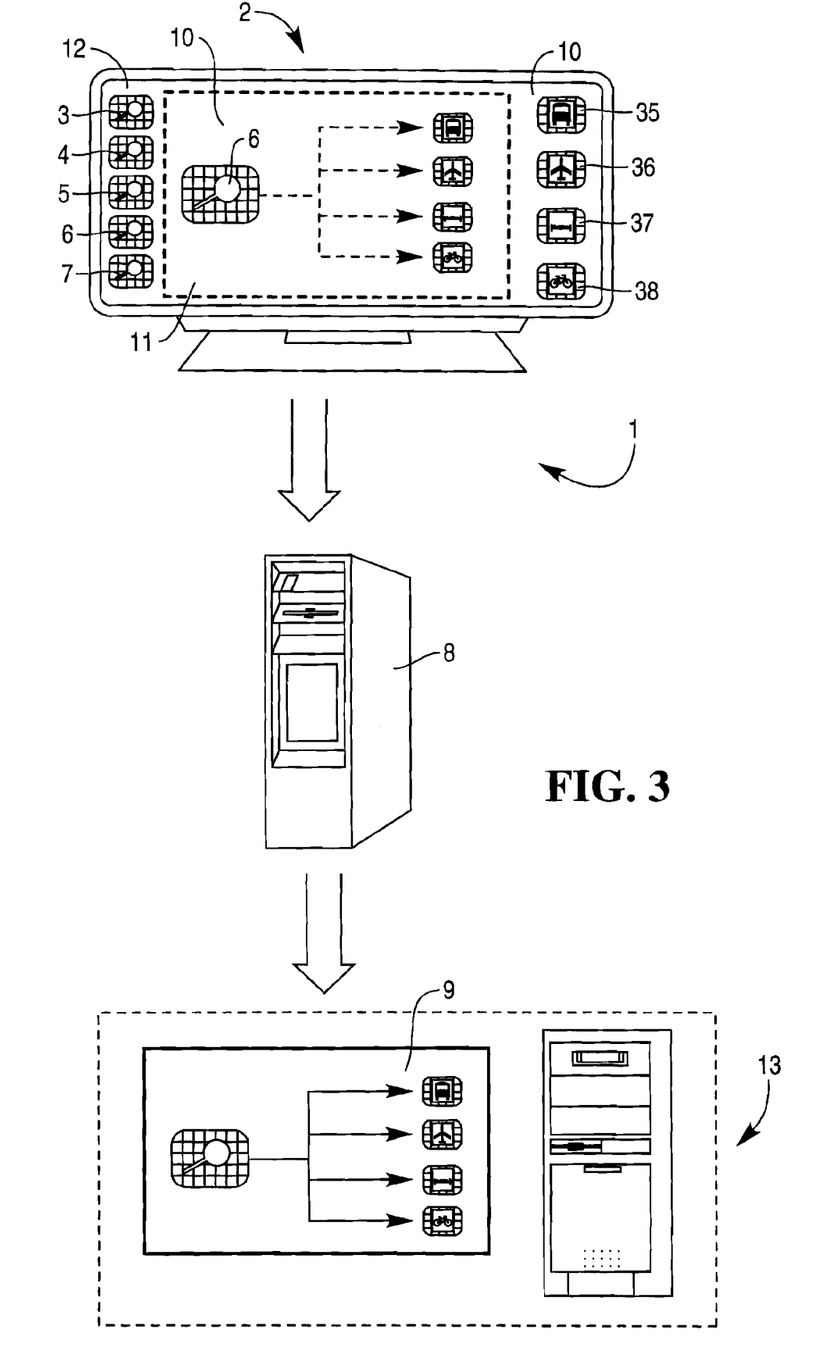
FIG. 3 is a schematic view of a further embodiment of the system of FIG. 1.

In some embodiments, system 1 provides a number of standard facilities, such as an SQL editor, that imported icons 35 to 38 are able to leverage as required.

In some embodiments, icons are provided that are indicative of filtering processes to further simplify the interlinking process. An example is a filter that converts a numerical value to a yes/no identifier.

System 1 includes various inputs for importing information processes into the interface. At one level, the process editor is an input in that it is used to define new icons indicative of new information processes. For example, to import a process X, a third party editor is used to access the SQL code for process X, and this is copied and passed into the process editor.

In some embodiments, system 1 includes further inputs. One class of input obtains the processes from software applications. This class of input examines available software applications and leverages their inherent processes to define icons for these processes. For example, an input that scans a predetermined information repository—such as a local or networked storage drive—to identify and obtain capabilities for use by system 1 in the creation of complex processes. It will be appreciated that for capabilities to be identifiable and obtainable by system 1, some conformity in development is required. A further class of input allows software applications inherently adapted to function with system 1 to install their own icons indicative of processes into interface 2. These applications are inherently adapted for leveraging by system 1. In an exemplary embodiment, when an application X is loaded onto a computer Y, and computer Y makes use of system 1, icons indicative of processes included in application X are installed for use in the interface 2 held on computer Y.

The term "leveraging" refers to the process whereby the functionality of a first software component is used by a second software component. In the present embodiment, system 1 uses the extensibility capabilities inherent to a suitable object oriented (OO) programming environment such as Java. The OO extensibility model allows developers to leverage existing objects without the need to have access to the original source code. That is, where a first component references a second component in the OO environment, the functionality of the second component is available to the first component. This includes any functionalities the second component object has obtained by referencing further components.

As new applications are developed, new icons are developed for use with system 1 to leverage the functionalities of these applications. In some embodiments the icons are developed by the makers of system 1, whilst in other embodiments the makers of applications develop the icons themselves. The icons allow less technical users to define the processing that allows them to take data from one application, transform it and load it into another application. This model will work for almost all applications that need to be fed data.

With this model, system 1 becomes a form of data broker. The processes created by end users can extract data from one application, transform it (if need be) and load the results into another application. If desired, the results are also be placed into a table that is used for another purpose or even into an application specific table which doesn't yet provide an icon available in interface 2.

It will be appreciated by those skilled in the art that an application-specific icon based approach to data brokerage reduces the complexity of individual applications because any one application doesn't have to support all of the others. Rather, an import icon is shipped with each application, the icon being available in interface 2. The import icon defines how that application receives data. As such, it is restively easy for end users to build complex processes that transfer data from one application to another. Further, an application need not be adapted to support data transfer with a plurality of other applications, only to facilitate data transfer into itself.

Figure 2:
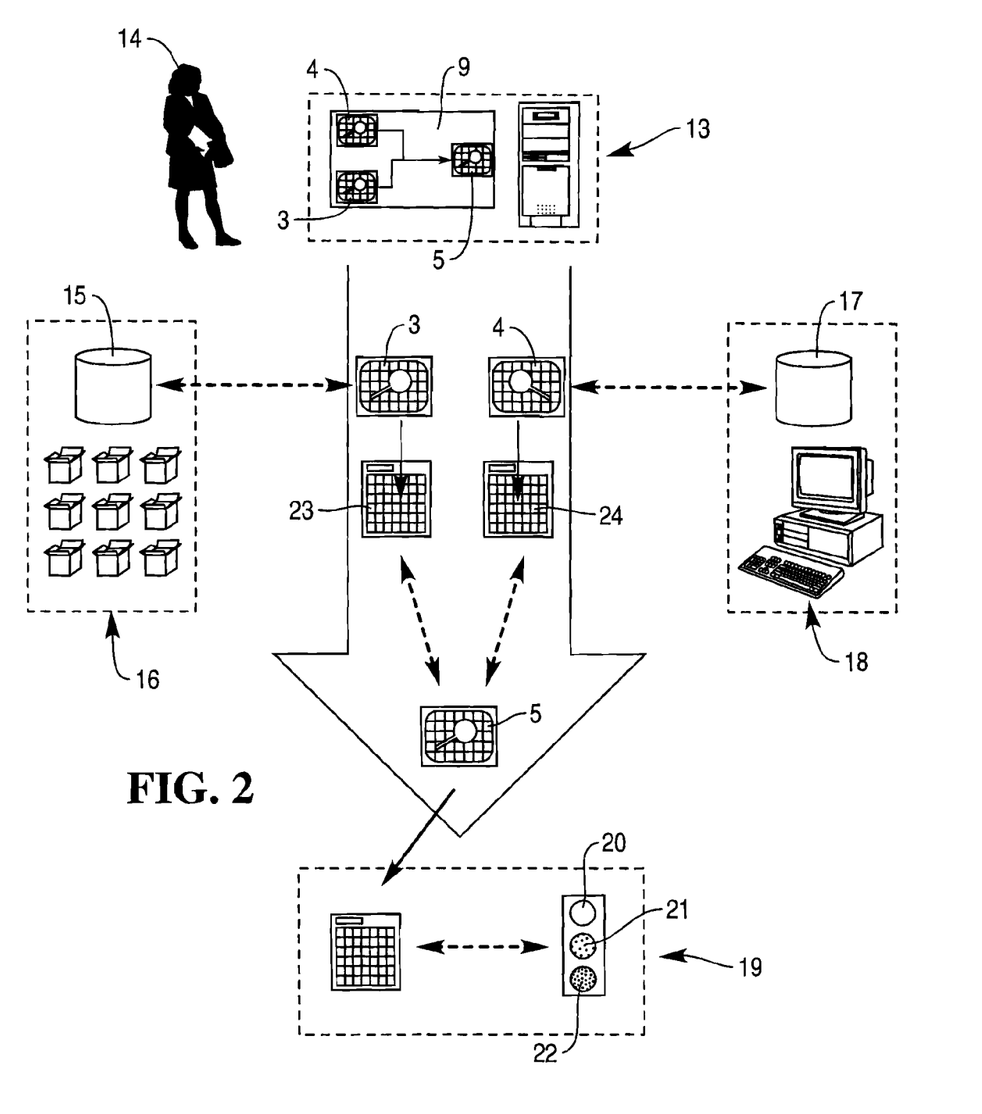
FIG. 2 is a schematic view of an implementation of the system of FIG. 1.

For the sake of illustration, exemplary information processes are described for the present embodiment. These are described by reference to a hypothetical web retailer 14 that sells consumer items via the internet. It will be appreciated that the invention is by no means limited to aspects, features and procedures described in this and other examples.

Retailer 14 maintains an inventory database 15, which is regularly updated to maintain a record of the quanta of consumer items in a storeroom 16. Each time a consumer item enters or leaves storeroom 16, an inventory monitoring system updates database 15. Retailer 14 also maintains a web-order database 17, which maintains a record of orders placed through a website 18 administered by retailer 14. Database 17 is updated in real-time to include information relating to the quanta and nature of consumer items ordered though website 18.

Although, in an ideal situation, databases 15 and 17 are integrated such that the inventory information is constantly updated as web-orders are received, this is not the case for the sake of the present example.

The concern that is felt by retailer 14 is to ensure that there are sufficient consumer items in storeroom 16 to meet the demand stemming from web-orders. Web-orders are not processed immediately—the orders for one 24-hour period are only provided to a dispatch department at storeroom 16 at the end of that 24-hour period for processing during the following 24-hour period. Due to a lack of space in storeroom 16, retailer 14 only keeps the bare minimum stock, and orders further stock from suppliers as required. As such, retailer 14 has a desire to be informed promptly when there is cause to order further consumer items from a supplier.

Retailer 14 has access to a Key Performance Indicator (KPI) dashboard 19, which is a java-based administrative tool for defining a KPI. The KPI dashboard of the present embodiment analyses data to determine whether a user-defined KPI is met, and provides a visual signal indicative of which (if any) KPI is met, Retailer 14 wished to use KPI dashboard 19 to provide a signal indicative of whether further consumer items should be ordered from a supplier. As such, dashboard 19 analyses data to determine whether predetermined conditions are met insofar as aspects of the contents of databases 15 and 17 are concerned. The method of analysis and conditions are user defined as part of a wizard-like interface within dashboard 19.

The present example discloses a method for using a dashboard application in a somewhat counterintuitive fashion. In general, a dashboard is used to monitor the health or performance of the organisation, and is typically not responsive to individual events. A dashboard is better suited to the more complicated task of analysing the occurrence of predetermined conditions over a time period for the purpose of improving management strategies. The tasks carried out by the present dashboard would be better suited to a stock control application or the like. The present example acknowledges such inherent practical defects, and is designed to provide a relatively simplistic disclosure of an implementation of system 1 for the benefit of the reader. Those skilled in the art will be able to extend the present example to more complicated and practically worthwhile situations.

For the present example, dashboard 19 processes a first, second and third column of data to produce a value between 1 and 30. A green light 20 is illuminated if the produced value is between 1 and 10, an orange light 21 is illuminated if the value is between 11 and 20, and a red light 22 is illuminated if the value is between 21 and 30.

In the present example:
Icon 3 is indicative of a process A that queries database 15 to obtain stock information for storeroom 16. Process A is a SQL process included in a java application designed to operate in conjunction with database 15.
In particular, process A obtains stored quanta of each consumer item held in storeroom 16. Process A obtains this information from database 15, generates a table 16, and loads the information into table 23. Table 23 includes 2 columns—one describing the consumer items, the other detailing the respective quanta for the consumer items.

Icon 4 is indicative of a process B that queries database 17 to obtain information about web-orders made through website 18. Process B is a function of a java application designed for use with e-commerce system components, such as website 18. The information includes the quantum of each consumer item ordered in the previous 24 hours, and in the three previous 24-hour periods. Process B performs some processing on this information to predict the likely quantum of each consumer item that will be ordered in the next 24 hours. In this example, this prediction is calculated by reference to the percentage variations in orders over the four 24-hour periods, and applying an average of these percentage variations to predict orders for the next 24-hour period. Process B obtains this information from database 17, generates a table 24, and loads the information into table 24. Table 24 includes three columns—a first column describing the consumer items, a second column detailing the quantum of each consumer item ordered in the past 24 hours, and a third column detailing the predicted quantum of consumer items to be ordered in the next 24 hours.

Icon 5 is indicative of a process C that loads information into dashboard 19. This will be recognised as an import icon, as defined above. Icon 5 provides access to a selection interface for nominating the first second and third columns for dashboard 19. In this embodiment, icon 5 was sold as part of system 1 for the specific purpose of supporting the dashboard.

Retailer 14 adapts dashboard 19 to be responsive to the results of processes A and B. In particular:

The green light is represented as being illuminated if there is no need to order further consumer items from suppliers. That is, the quantum of any given consumer item in storeroom 16 exceeds the quantum that consumer item ordered in the past 24 hours plus the quantum of that consumer item predicted to be ordered in the next 24 hours.

The orange light is represented as being illuminated if it is likely that further consumer items will be needed in the next 24 hours. That is, the quantum of at least one given consumer item in storeroom 16 is less than the quantum that consumer item ordered in the past 24 hours plus the quantum of that consumer item predicted to be ordered in the next 24 hours.

The red light is represented as being illuminated if orders are required to meet current demand. That is, the quantum of at least one given consumer item in storeroom 16 is less than the quantum that consumer item ordered in the past 24 hours.

The manner for adapting an application such as dashboard 19 to achieve such a goal will be understood by those skilled in the art, particularly when presented with an appropriate dashboard.

Prior to implementing system 1, retailer 14 manually performed processes A and B daily, and subsequently manually feed the data into dashboard 19. In response to this, the dashboard provided a green, orange or red light for that day. Retailer 14 had a desire for the light to be updated more regularly, however was going to involve a relatively high level of manual effort in performing queries and entering data. Retailer 14 implements system 1 to automate the process, and hence obtain increased value from dashboard 19.

To implement system 1, retailer 14 first initiates interface 2. A wizard is run to automatically define icons indicative of processes A and B, the wizard asking retailer 14 to define sources of processes—in this case being the two abovementioned Java applications that previously provided processes A and B respectively. The processes contained within these applications are then automatically leveraged to define icons 3 and 4, which then appear in sidebar 12. Icons 5, 6 and 7 are standard icons included with system 1, and these also appear in sidebar 12.

Retailer 14 drags and drops icons 3, 4 and 5 into field 11, and interlinks them as shown in FIG. 1 using graphical connection tools provided by interface 2. This will be recognised as the desired user-defined process order for the current task. The process editor is used to slightly modify processes A and B, particularly to ensure a suitable definition of tables 20 and 21 is provided. The 5 selection interface for icon 5 is then accessed to conveniently nominate the first, second and third column of data for dashboard 19. In this case, second column of table 23 is nominated to be the first column, the second column of table 24 is nominated to be the second column, and the third column of table 24 is nominated to be the third column.

Once the above steps are completed, the processes are compiled by processor 8 to define complex information process 9. Process 9 is then sent to server 13 with the instructions to execute process 9 whenever new data is loaded into either of databases 15 and 17. Server 13 is responsive to databases 15 and 17 for this purpose. In other situations, an instruction to simply execute process 9 every five minutes is provided instead. However, in other embodiments, alternate run times are used.

The end result is that each time a change occurs in either of databases 15 and 17, a green/orange/red indicator light is updated to keep retailer 14 promptly informed of the need to order further consumer items from suppliers. Writing a program that would perform and integrate processes A and B with dashboard 19 will be recognised as a difficult task for retailer 14. On the other hand, creating a complex process using system 1 to perform the necessary integration is relatively simple. This is primarily because the complexities, intricacies or mechanics of extracting data from applications 15 and 17 and loading data into the KPI dashboard are embodied in the icons 3, 4 and 5 respectively. Thus the activities left to the user are to use the data values obtained from databases 15 and 17 via icons 3 and 4 in a calculation that results in a number suitable to be loaded via icon 5 into the KPI dashboard application. The "suitability of the number calculated" is determined by the settings made by the user to represent the green, orange and red conditions of the traffic light.

Figure 4:
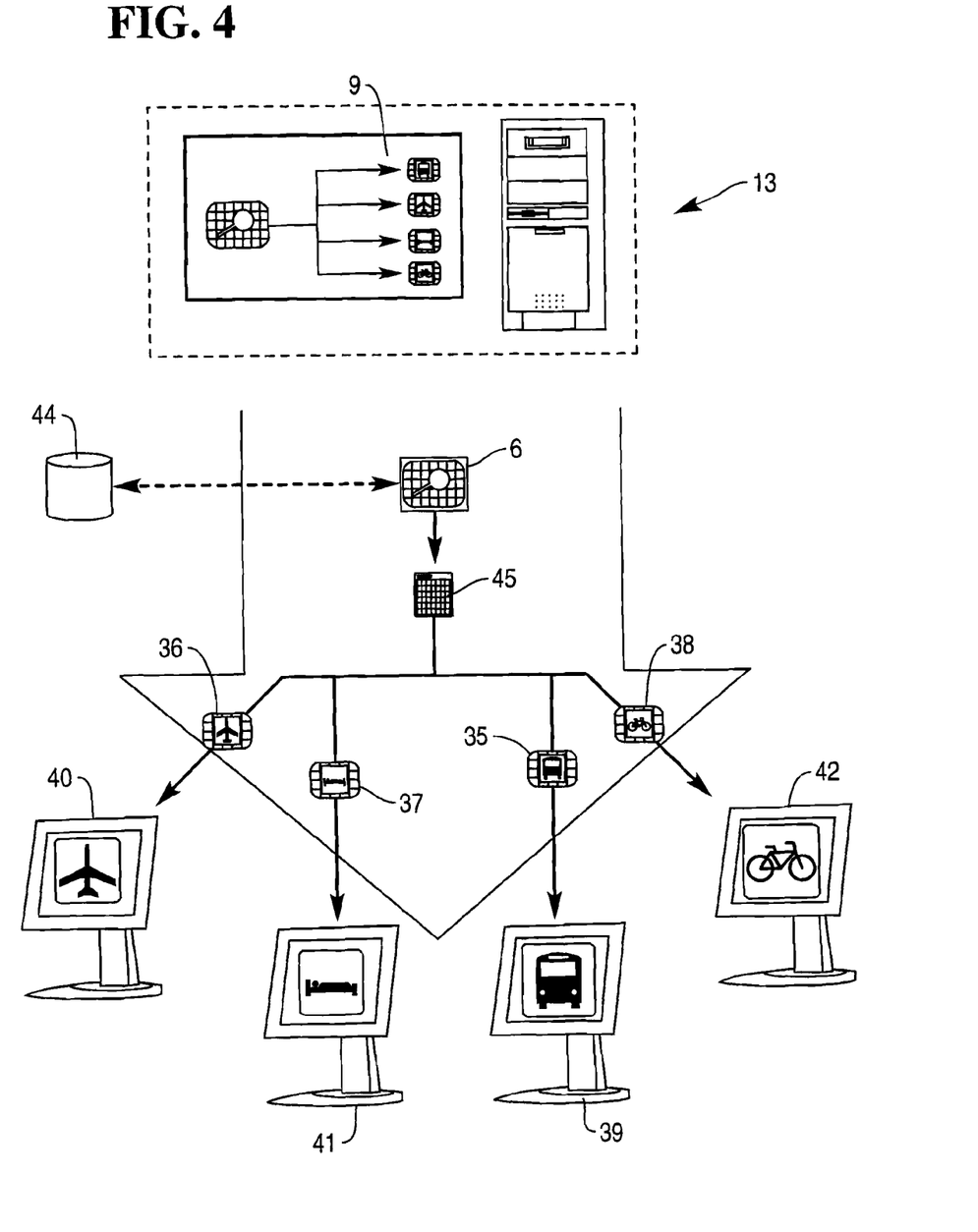
FIG. 4 is a schematic view of an implementation of the system of FIG. 3.

FIGS. 3 and 4 illustrate an alternate embodiment of interface 2 wherein the data brokering aspects are exemplified.

In this embodiment, GUI 10 includes a further sidebar 30, which includes import icons 35 to 38. Icons 35 to 38 are indicative of information processes for loading data into software applications 39 to 42, as shown in FIG. 4. Icons 35 to 38 were defined during the development of applications 39 to 42 to facilitate data brokerage between these and other applications through system 1. It will be recognised that, in FIGS. 3 and 4, import icons are graphically represented such that they each correspond with their respective applications.

When each of applications 39 to 42 were installed into a computer system making use of system 1, the respective icons 35 to 38 were automatically incorporated into GUI 10. As such, a user is able to create a complex process, such as process 43, that loads data into any one or more of applications 39 to 42.

In the illustrated example, the user defined process order commences with a process identified by icon 6. This process queries a database 44 to obtain a table 45 of information. The user defined process order then includes each of import icons 35 to 38 in parallel. The practical meaning is that the information obtained from database 44 is substantially simultaneously loaded into each of applications 39 to 42. It will be appreciated that the selection interface for each of icons 35 to 38 will be used to nominate the relevant columns in table 45 for the purposes of each of applications 39 to 42.

FIG. 4 schematically demonstrates how the exemplary complex process 9 of FIG. 3 is carried out. For the sake of the example, consider 13 as a web-based execution server that has been instructed to execute process 9 once daily at a set time. It will be appreciated that, in practice, a more involved complex information process is developed using the process order of process 9 as a foundation. For example, once the information is loaded into each application, one or more processes particular to each application are performed, and this information is compiled into a single table which, for example, is fed into a dashboard application. The ease of creating such a complex process using system 1 will be recognised by those skilled in the art, particularly in light of typical solutions.

From a practical perspective, system 1 includes a standalone software application in some embodiments. Typically, a software application having three layers is utilised. These layers are as follows:

- A hidden layer that defines the structure of a process. This level is an "internal representation" and has no visual representation of the plans. This is intended to be used by developers who are building applications that create "batch" or "background" processes and do not need to represent these processes visually to the end user.
- A layer that builds upon the first layer by adding a visual representation of the processes. This layer is in the form of components that can not function on there own but rather require something the "contain" them. This layer is similar to standard GUI components such as trees, buttons, menus etc. It will be appreciated that these must have a container, such as a window, into which they can be placed. This second layer is for use by developers of GUI applications who wish to present processes graphically to an end user—such as within a window that contains other graphical controls.
- A set of applications that leverage the second layer to provide a standalone capability that may be used directly by end users, such as system 1.

The above is exemplary only, and not taken to be limiting on the construction of system 1.

It will be appreciated from the exemplary embodiments above that the present invention is readily applied to information systems for the purpose of managing information. The above examples describe implementations both from a complex process generation and data brokerage standpoint. This being said, at will be appreciated there are a multitude of further implementations that are possible. Indeed, although the present invention has been described with particular reference to certain preferred embodiments thereof, variations and modifications of the present invention can be effected within the spirit and scope of the following claims.

The invention claimed is:

1. A system for managing information, the system including:
   - an interface for allowing a user to manipulate identifiers indicative of respective information processes to create a user-defined process order; and
   - a processor responsive to the interface for compiling the information processes in accordance with the user-defined process order to define a complex information process.

2. A system according to claim 1 wherein the information processes are java based.

3. A system according to claim 1 wherein the information processes are JNI based.

4. A system according to claim 1 wherein the interface includes a GUI for representing the identifiers as graphically manipulatable icons.

5. A system according to claim 4 wherein at least one icon is an import icon indicative of an information process for importing into an application one or more columns of data from one or more tables.

6. A system according to claim 5 wherein the import icon provides access to a selection interface for nominating the one or more columns of data and one or more tables.

7. A system according to claim 4 wherein the GUI includes a free form drawing field for graphically creating the user-defined process order by graphically manipulating the icons.

8. A system according to claim 4 wherein the icons are graphically interlinkable to define a sequence in which two or more processes are performed in the user defined process order.

9. A system according to claim 8 wherein the two or more processes are performed in any one or more of the following manners:
   - sequentially;
   - in parallel; and
   - upon the occurrence of a predefined event.

10. A system according to claim 1 wherein each information process has one or more execution requirements, and the interface is responsive to the execution requirements for restricting manipulation of the identifiers.

11. A system according to claim 1 including a server for executing the complex information process.

12. A system according to claim 11 wherein the server executes the complex information process in response to one or more predefined events.

13. A system according to claim 1 wherein the interface includes a process editor for modifying the information processes.

14. A system according to claim 1 including an input for importing the information processes into the interface.

15. A system according to claim 14 wherein the input scans a predetermined information repository for importable information processes.

16. A system according to claim 14 wherein the input allocates the icon for each information process.

17. A system according to claim 14 wherein the input obtains the processes from one or more applications.

18. A system according to claim 17 wherein a process represents a functionality of an application, and the input obtains this functionality.

19. A system for interfacing a plurality of information sources that accept information in compliance with respective data entry protocols, the system including:
   - an identifier associated with each information source, each identifier being indicative of the respective data entry protocol for the associated information source;
   - an input for receiving a first packet of information from a first one of the information sources;
   - an output for providing a second packet of information to a second one of the information sources; and
   - a processor in communication with the input and responsive to the identifier of the second one of the information sources for generating the second packet such that the second packet complies with the data entry protocol of the second one of the information sources.

20. A system according to claim 19 wherein the second packet is derived from the first packet.

21. A system according to claim 19 wherein the first packet and the second packet are substantially identical.

22. A system according to claim 19 wherein the processor is also responsive to the identifier of the first one of the information sources for generating the second packet.

23. A computer-implemented method for use in managing information, where the method, when implemented in one or more computer systems, causes the one or more computer systems to:
   manipulate identifiers indicative of respective information processes to create a user-defined process order; and
   compile the information processes in accordance with the user-defined process order to define a complex information process.

24. A method according to claim 23 wherein the information processes are java based.

25. A method according to claim 23 wherein the information processes are JNI based.

26. A method according to claim 23 further comprising representing the identifiers as graphically manipulatable icons in a graphical user interface (GUI).

27. A method according to claim 26 wherein at least one icon is an import icon indicative of an information process for importing into an application one or more columns of data from one or more tables.

28. A method according to claim 27 wherein the import icon provides access to a selection interface that allows nomination of the one or more columns of data and one or more tables.

29. A method according to claim 26 wherein the GUI includes a free form drawing field that allows graphically creating the user-defined process order by graphically manipulating the icons.

30. A method according to claim 26 wherein the icons are graphically interlinkable to define a sequence in which two or more processes are performed in the user defined process order.

31. A method according to claim 30 wherein the two or more processes are performed in any one or more of the following manners:
   sequentially;
   in parallel; and
   upon the occurrence of a predefined event.

32. A method according to claim 23 wherein each information process has one or more execution requirements, further comprising responding to the execution requirements for restricting manipulation of the identifiers.

33. A method according to claim 23 further comprising executing the complex information process.

34. A method according to claim 33 wherein the complex information process is executed in response to one or more predefined events.

35. A method according to claim 23 further comprising modifying the information processes.

36. A method according to claim 23 further comprising importing the information processes into the interface.

37. A method according to claim 36 further comprising scanning a predetermined information repository for importable information processes.

38. A method according to claim 36 wherein the input allocates the icon for each information process.

39. A method according to claim 36 further comprising obtaining the processes from one or more applications.

40. A method according to claim 39 wherein a process represents a functionality of an application, further comprising obtaining this functionality.

41. A computer-implemented method for use in interfacing a plurality of information sources that accept information in compliance with respective data entry protocols, where each information source includes an identifier that is indicative of the respective data entry protocol for the associated information source, and where the method, when implemented in one or more computer systems, causes the one or more computer systems to:
   receive a first packet of information from a first one of the information sources; and
   provide a second packet of information to a second one of the information sources, where the second packet is generated such that the second packet complies with the data entry protocol of the second one of the information sources.

42. A method according to claim 41 wherein the second packet is derived from the first packet.

43. A method according to claim 41 wherein the first packet and the second packet are substantially identical.

44. A method according to claim 41 wherein the second packet is generated in response to the identifier of the first one of the information sources.

* * * * *